Feb. 28, 1967 E. W. RAPP, JR., ETAL 3,306,425
OVERCAP ORIENTING APPARATUS
Filed Sept. 2, 1964 7 Sheets-Sheet 1
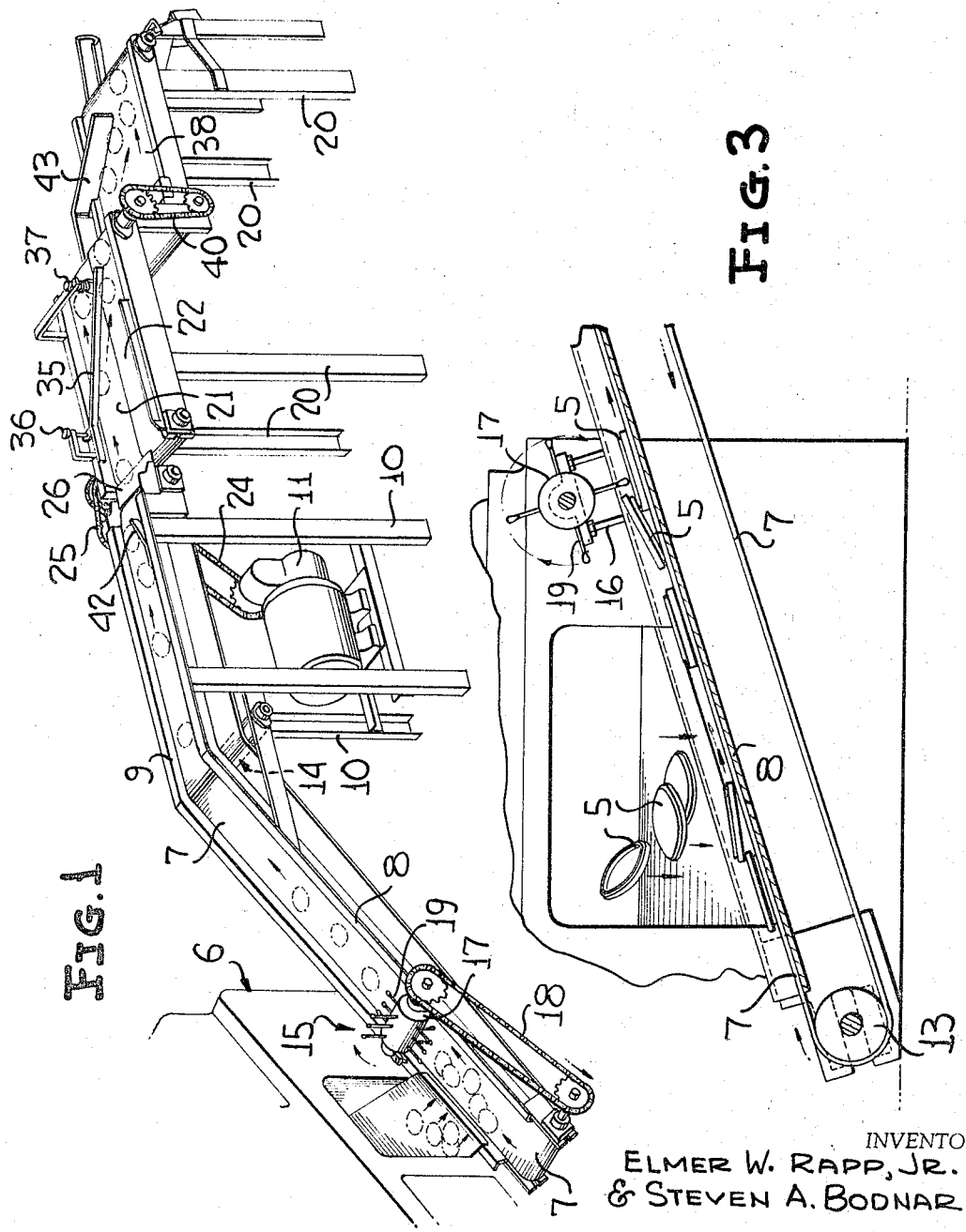
INVENTORS
ELMER W. RAPP, JR.
& STEVEN A. BODNAR
BY
ATTORNEYS Feb. 28, 1967　　　E. W. RAPP, JR., ETAL　　　3,306,425
OVERCAP ORIENTING APPARATUS
Filed Sept. 2, 1964　　　　　　　　　　　　　7 Sheets-Sheet 2
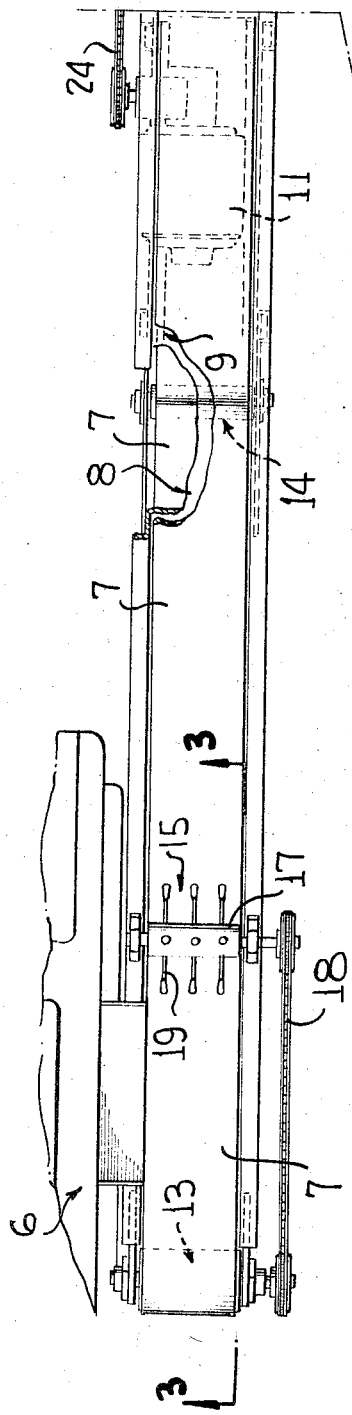
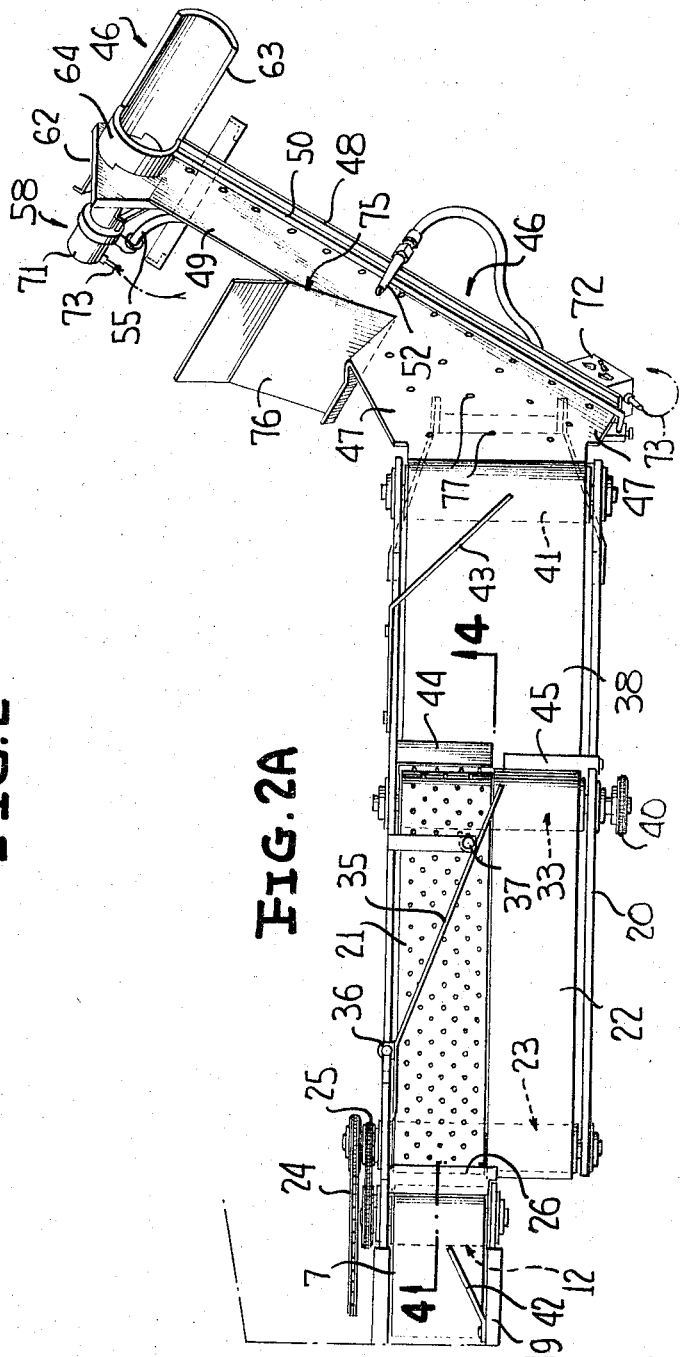
INVENTORS
ELMER W. RAPP, Jr &
STEVEN A. BODNAR
BY
Mason, Porter, Diller & Stewart
ATTORNEYS

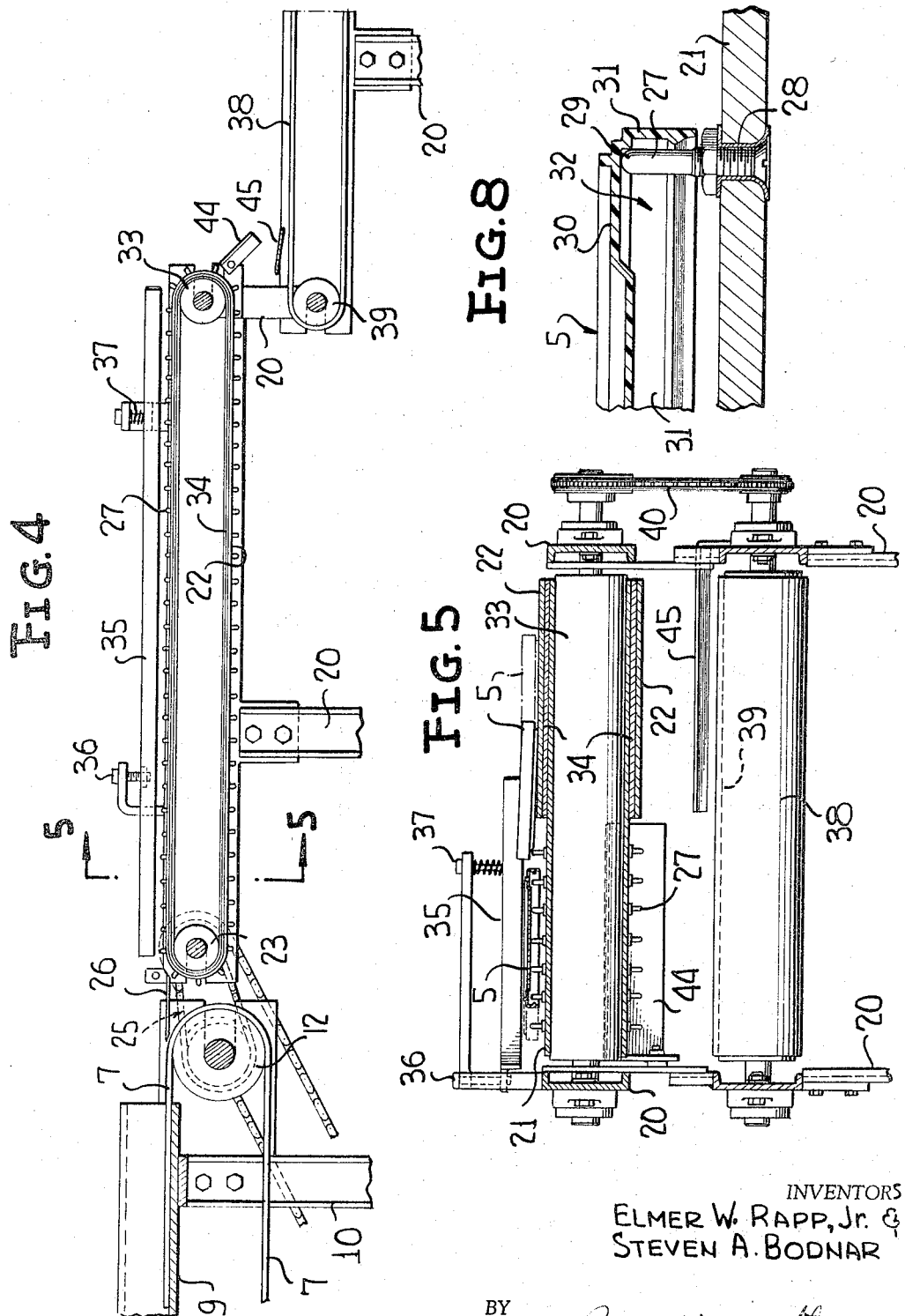

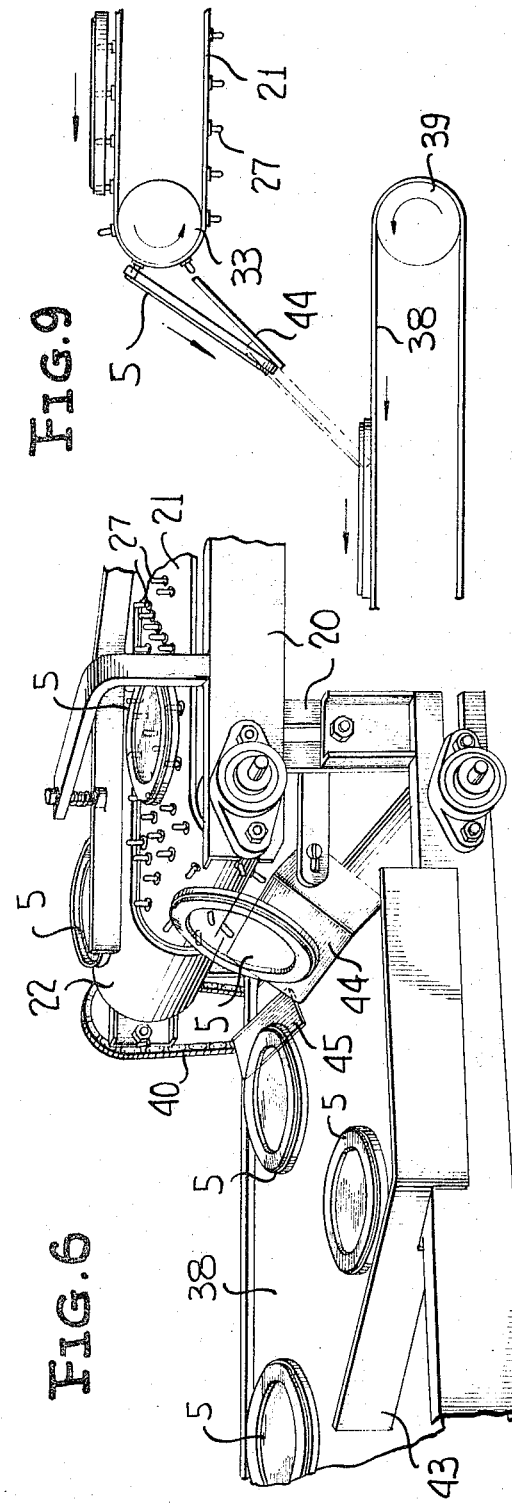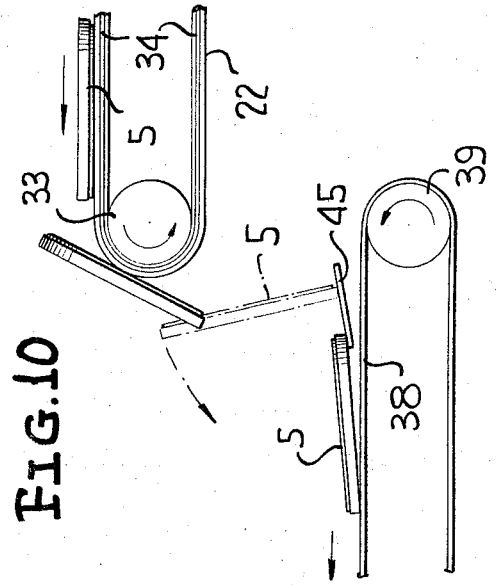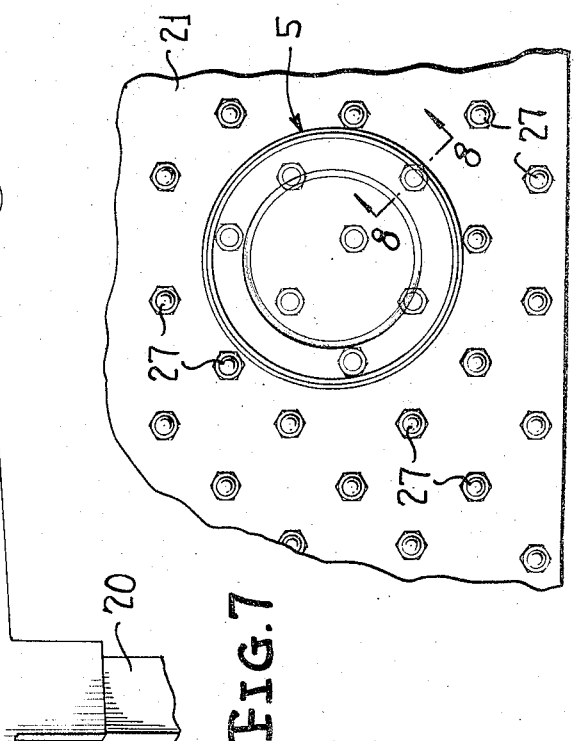

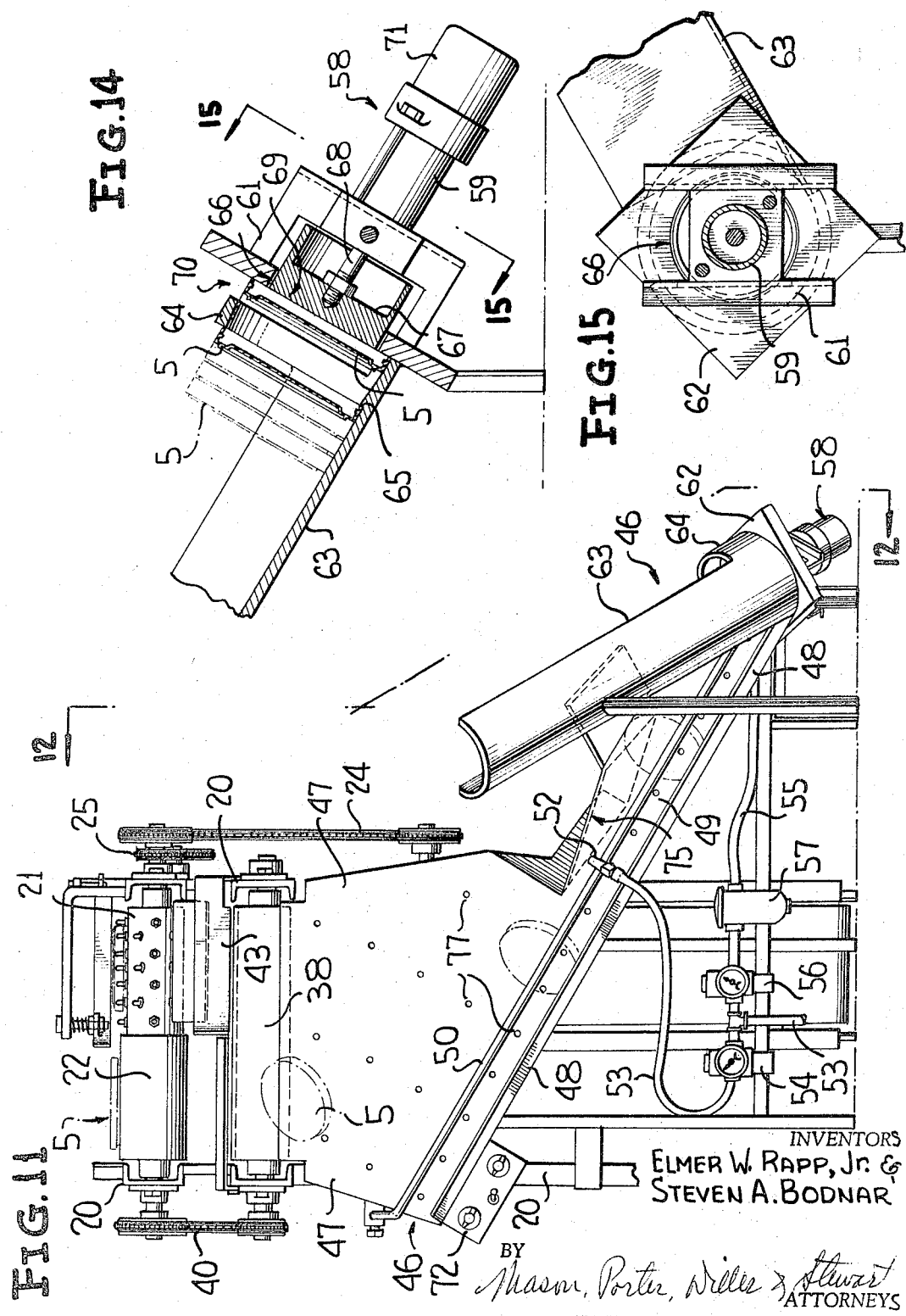

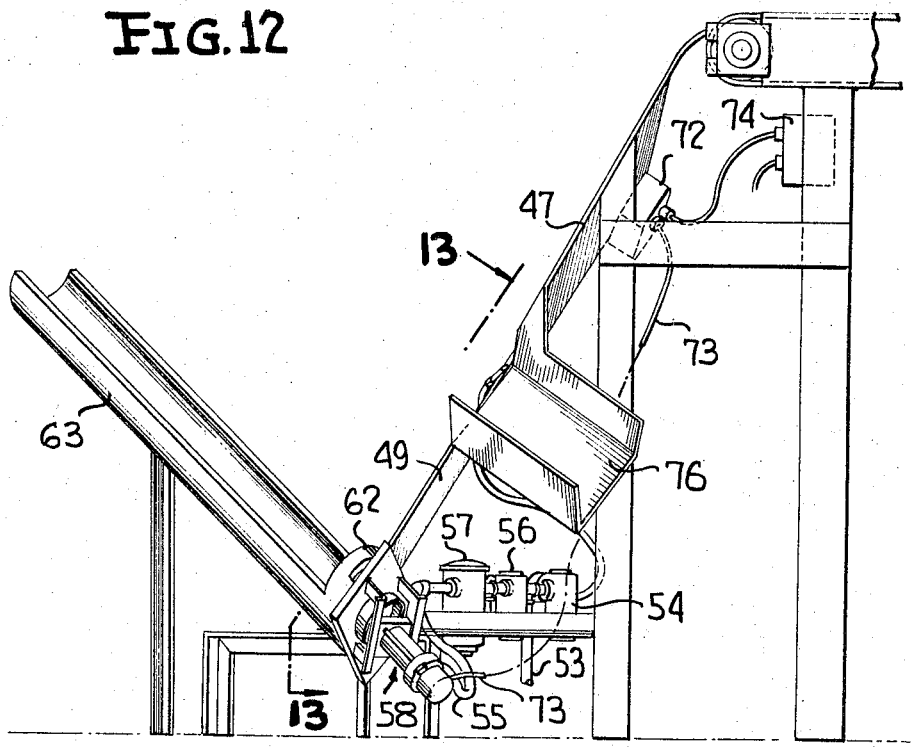
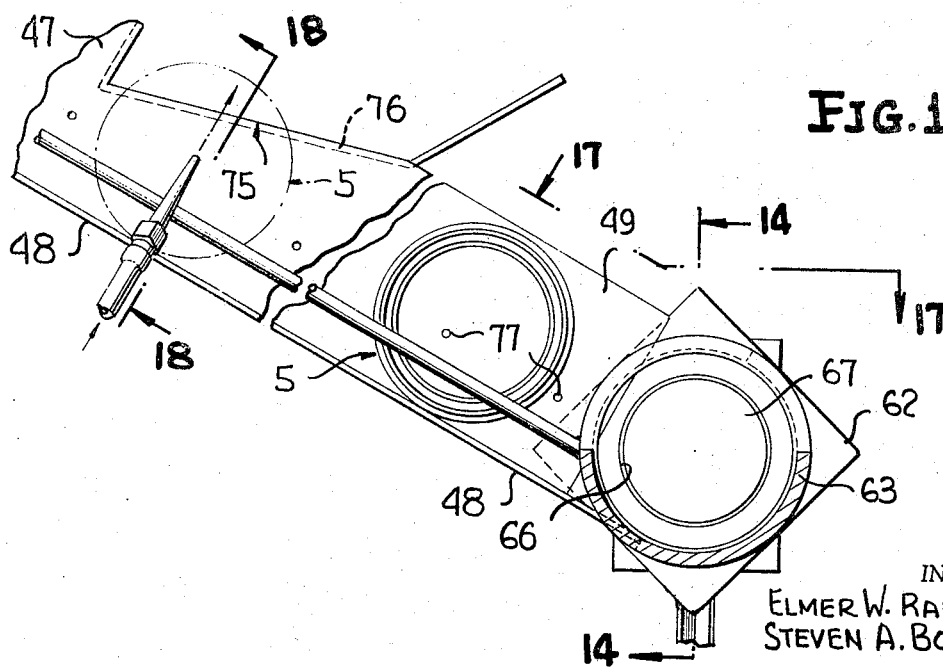

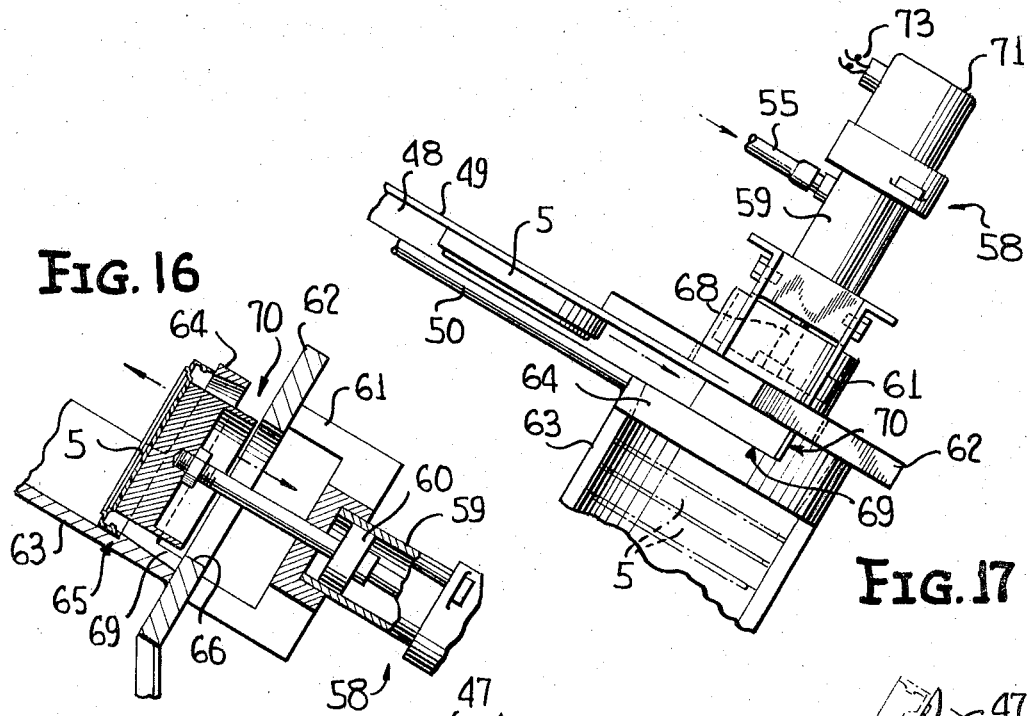
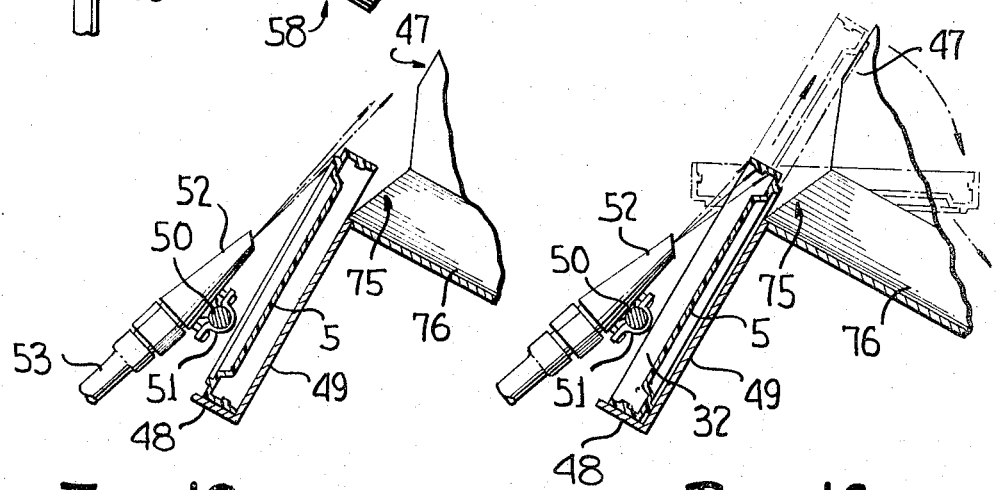

United States Patent Office 3,306,425
Patented Feb. 28, 1967

3,306,425
OVERCAP ORIENTING APPARATUS
Elmer W. Rapp, Jr., Elk Grove, and Steven A. Bodnar, Chicago, Ill., assignors to Continental Can Company, Inc., New York, N.Y., a corporation of New York
Filed Sept. 2, 1964, Ser. No. 393,840
11 Claims. (Cl. 198—33)

The invention relates generally to article orienting or arranging methods and apparatus and seeks to provide a novel apparatus for receiving, indiscriminately, plastic overcaps as they are delivered from an injection molding machine, or some other source, and orienting them, while they are being fed, for ultimate delivery to a work station, or for storage, with all caps in like positions.

While adapted for the orienting or arranging of other articles of comparable shapes including top or crown portions and depending peripheral skirts defining therewithin a hollow portion, the invention is designed particularly for the handling of overcaps which are molded of deformable, resilient plastic, such as polyethylene or the like, and intended to be snapped over the tops of containers such as coffee cans to serve as reclosure devices after the containers have been opened. These overcaps are quite popular and are extensively used at the present time, and there has been a need for an efficient orienting apparatus to handle these light weight bouncy articles so that they can be presented at a use or storage station with all hollow portions thereof presented in a like direction. One example of such an ultimate delivery point or station is a stacking means, but the present invention is not limited to this particular delivery.

An object of the invention is to provide an apparatus of the character stated wherein there is included a travelling belt on which the overcaps or other articles are received and which is provided with upstanding pins arranged in spaced relation so that a plurality thereof will certainly project up into the hollow of each hollow-down article presented thereon and support the same with its peripheral skirt extending down to or just short of the top surface of the belt, whereas all articles presented to the belt in hollow-up positions will be supported by engagement of their tops or crown portions on the pins and with their peripheral skirts projected upwardly well above the tops of the pins, means also being included for sweeping off from the belt all such hollow-up articles, thereby to present at the delivery end of the belt only such articles as are moving hollow-down on the belt.

Another object of the invention is to provide an apparatus of the character stated wherein a second belt travels along beside the pin equipped belt and receives and conveys the hollow-up articles swept thereonto from the first belt.

A further object of the invention is to provide an apparatus of the character stated wherein means are provided for preventing delivery to the pin equipped belt of articles in superposed relation.

A still further object of the invention is to provide an apparatus of the character stated wherein the second belt is caused to move at a greater linear speed than is the first belt.

Yet another object of the invention is to provide an apparatus of the character stated wherein the means for sweeping off articles from the first belt comprises an angularly disposed diverter bar traversing the first belt at an elevation for clearing pin carried hollow-down articles but which will engage and divert the higher projecting hollow-up articles onto the second belt.

Another object is to provide an apparatus of the character stated wherein the means for preventing delivery to the pin equipped belt of articles in superposed relation includes a delivery belt and a rotor traversing the same and having thereon peripheral projections moving in a direction counter to the direction of movement of the delivery belt and spaced therefrom to be engageable only with articles superposed on other articles and not with sole articles.

Still another object of the invention is to provide an apparatus of the character stated wherein the second belt travelling beside the pin equipped belt is supported so that its top or article receiving and conveying surface is disposed approximately at the level of the tops of the pins on the pin equipped belt.

Yet another object of the invention is to provide an apparatus of the character stated wherein is included a take-away belt having a receiving end disposed below the delivery end of the pin equipped belt and the belt travelling at its side and wide enough to receive articles delivered thereonto by both said belts, and diverter bar means traversing a portion of the last named wide belt and effective to divert articles so as to cause them to move along in single file on said wide belt.

A further object of the invention is to provide an apparatus of the character stated wherein is included a take-away belt having a receiving end disposed below the delivery end of the pin equipped belt and the belt travelling at its side and wide enough to receive articles delivered thereonto by both said belts, means engageable by articles as they are being delivered by the pin equipped belt to cause them to remain in their hollow-down position as they fall upon the take-away belt, and means engageable by articles as they are being delivered by the belt beside the pin equipped belt to cause them to be inverted from a hollow-up position to a hollow-down position.

A still further object of the invention is to provide an apparatus of the character stated wherein is included a take-away belt having a receiving end disposed below the delivery end of the pin equipped belt and the belt travelling at its side and wide enough to receive articles delivered thereonto by both said belts, an inclined plate means engageable by articles as they are being gradually released by the belt pins to cause them to remain in their hollow-down position as they fall upon the take-away belt, and a dead plate means overlying the take-away belt in position to intercept the falling of articles from the belt beside the pin equipped belt to prevent contact with the take-away belt until after each article has turned slightly more than 90° in falling and has contacted the dead plate in its course of inversion falling over onto the take-away belt.

Yet another object of the invention is to provide an apparatus of the character stated including the above mentioned inclined plate means and dead plate means, together with diverter bar means overlying a portion of the take-away belt beyond said two plate means and effective to divert articles so as to cause them to move along in single file on the take-away belt.

With the above and other objects in view that will hereinafter appear, the nature of the invention will be more clearly understood by reference to the following detailed description, the appended claims and the several view illustrated in the accompanying drawings.

In the drawings:

FIGURE 1 is a perspective view illustrating a preferred embodiment of the invention.

FIGURES 2 and 2A together comprise a plan view of the apparatus shown in FIGURE 1, parts being broken away.

FIGURE 3 is a vertical longitudinal sectional view illustrating the receiving of overcaps from the injection molding machine onto the receiving end of the intake conveyor, the means for preventing travel of the overcaps in superposed relation also being shown.

FIGURE 4 is an enlarged vertical longitudinal sectional view illustrating the cap orienting belt conveyor arrangement, including the delivery end of the intake conveyor and the receiving end of the take-off conveyor.

FIGURE 5 is an enlarged vertical cross sectional view taken on the line 5—5 on FIGURE 4.

FIGURE 6 is an enlarged fragmentary perspective view illustrating the delivery of overcaps over the end of the orienting conveyors.

FIGURE 7 is a fragmentary plan view illustrating a single overcap in position over a plurality of supporting pins on the pin equipped conveyor belt.

FIGURE 8 is an enlarged fragmentary sectional view taken on the line 8—8 on FIGURE 7.

FIGURE 9 is a somewhat schematic fragmetary elevational view illustrating the gradual delivery of an overcap onto the inclined dead plate in a manner for insuring a hollow-down delivery of the cap onto the take-off conveyor.

FIGURE 10 is a view similar to FIGURE 9 illustrating delivery of a hollow-up overcap from the conveyor belt portion beside the pin equipped belt portion onto the dead plate which assures delivery of the overcap onto the take-off conveyor in a hollow-down position.

FIGURE 11 is an end elevation illustrating the delivery of overcaps from the discharge ends of the orienting conveyor belts onto the take-off conveyor and from thence onto a receiving station, here shown in the form of a stacking means.

FIGURE 12 is a side elevation looking at the structure of FIGURE 11 as on the line 12—12 on said FIGURE 11.

FIGURE 13 is a fragmentary sectional view taken on the line 13—13 on FIGURE 12.

FIGURE 14 is a fragmentary sectional view taken on the line 14—14 on FIGURE 13, the stacking plunger being shown in its retracted position.

FIGURE 15 is a fragmentary sectional view taken on the line 15—15 on FIGURE 14.

FIGURE 16 is a fragmentary sectional view similar to FIGURE 14, the stacking plunger being shown in its projected position for placing an overcap in the stack.

FIGURE 17 is a fragmentary plan view looking down on the fragment of the stacking means at the line 17—17 on FIGURE 13.

FIGURES 18 and 19 are enlarged cross sectional views taken on the line 18—18 on FIGURE 13, FIGURE 18 illustrating the action as an overcap is passing the ejector jet in a crown-up position, and FIGURE 19 illustrating an overcap passing the ejector jet in a hollow-up position, the overcap being shown in the process of ejection in dot and dash lines.

In the herein disclosed example of embodiment of the invention, the novel apparatus is shown as receiving plastic overcaps 5 as they are being delivered indiscriminately, from an injection molding machine 6 in which they are formed. The caps are delivered onto an endless intake belt or conveyor 7 having its lower or receiving end disposed on an upward incline over a slideway or support 8, and its upper or delivery portion on a horizontal portion 9 of the slideway. The slideway best shown in FIGURES 1, 2, 2A, 3 and 4 is suitably supported on a frame structure generally designated 10 and which also supports a driving motor 11 as best shown in FIGURES 1 and 2.

The conveyor belt 7 passes over a driver roll or pulley 12 at its delivery end, and over an idler roll 13 at its lower or receiving end. The lower flight of said belt is supported intermediately on a frame supported idler roll 14. It will be apparent by reference to FIGURES 1, 2 and 3 that a stripper wheel generally designated 15 is supported at 16 over the belt 7 at a position beyond the delivery thereonto of the overcaps, and this wheel includes a rotor body 17 which is driven by chain and sprocket connections 18 from the shaft on which the idler 13 is mounted and said rotor body has sweep pins 19 projecting from its periphery into position as shown in FIGURE 3 for sweeping off any overcaps 5 travelling along in superposed relation upon other overcaps.

Suitable frame structure generally designated 20 and best shown in FIGURES 1 and 4 through 6 supports the overcap orienting or arranging means, the latter including the pin equipped belt or conveyor 21 and a belt or conveyor means 22 devoid of pins and travelling beside the conveyor 21, as best shown in FIGURES 1, 2A, 5 and 6. The belts 21 and 22 pass over a driver roll or pulley 23 at their receiving ends, said roll being driven by chain and sprocket means 24 from the motor 11, and it will be noted that from this same roll the intake belt or conveyor 7 is driven by sprocket and chain means 25.

It will be apparent by reference to FIGURES 1, 2A and 4 that the belt 7 delivers overcaps onto a dead plate 26 from which they pass onto the belt 21, being picked up by the pins thereon as they pass about the roll or pulley 23. Pins 27 are grouped on the belt 21 in the manner clearly illustrated in FIGURES 2A, 6 and 7 so that a plurality thereof are received in each overcap hollow, as clearly illustrated in FIGURES 5 and 8. It will also be apparent by reference to FIGURE 8 that each pin 27 is mounted on a reinforcing grommet 28 and includes a rounded supporting head 29. Each overcap 5 includes a head or crown portion 30 and a depending snap skirt 31 defining therewithin a hollow 32.

At their delivery ends the belts 21 and 22 pass over a free rotating roll or pulley 33, as clearly illustrated in FIGURES 2A and 4. The belt 22 which is devoid of upstanding pins may be mounted over one or more support belts as at 34, as shown in FIGURES 4, 5 and 10, one of which belts may be the belt 21 as shown, or over enlarged pulley portions, to provide greater diameter. There are two purposes for this manner of mounting and arranging the belts, one to increase the linear speed of the belt 22 relative to the pin equipped belt 21, and two, to provide a higher level of the top or overcap conveying surface of the belt 22 relative to the rounded top portions 29 of the pins 27. By reference to FIGURE 5 it will be observed that the top surface of the belt 22 is at approximately the same level as the upper end extremities or rounded heads 29 on the pins 27.

A sweep or stripper bar 35 traverses the belt 21 as shown in FIGURES 1, 2A, 4 and 5, said bar being supported at 36 at the side of the frame, and by an upwardly yieldable intermediate support at 37. It will be apparent by reference to FIGURE 5 that the sweep bar 35 is placed to clear the top or crown portions of overcaps having their hollow portions 32 facing downwardly with the conveyor pins 27 projecting upwardly thereinto and supporting the overcaps by engagement with the tops or crown portions thereof as indicated at the left in FIGURE 5. However, the lower or stripper edge portion of the bar 35 is so disposed that it will engage and divert or strip off any overcaps 5 which may be travelling along supported with their hollow portions 32 directed upwardly and with their top or crown portions engaging over and supported by the upper end extremities of the pins 27, 29. It will be noted that one such overcap is being shown as diverted to the side or stripped off the supporting pins and onto the conveyor belt 22 at the right hand side of FIGURE 5.

The delivery ends of the belts 21 and 22 are disposed over the receiving end of a take-away belt or conveyor 38, as best shown in FIGURES 4 and 5. The take-away belt 38 also is supported on the framing 20 on a roll or pulley 39 driven preferably at a higher speed than the rolls 33 and 23, by sprocket and chain connections 40 from the roll 33 as shown in FIGURES 1, 4, 5, 6 and 11, and on the idler roll or pulley 41.

If desired, a diverter 42 may be mounted at the delivery end of the conveyor belt 7 as shown in FIGURES 1, 2A to divert overcaps toward one side of the pin equipped conveyor 21, and a diverter 43 may be mounted over at least a part of the take-off belt 38 as in FIGURES 1, 2A and 11 to divert overcaps delivered from the belt 21 into single file alignment with those delivered from the belt 22.

It will be apparent that the lateral diversion of hollow-up travelling overcaps onto the conveyor 22 by the bar 35 will retard the speed of movement of such diverted overcaps relative to overcaps which pass through beneath the bar 35 because they are being conveyed hollow-down on the pin equipped conveyor 21. The increase in linear speed of the belt 22 relative to the belt 21 thus will tend to reestablish the previous relation of overcaps on the conveyors as they are approaching the delivery ends of the belts 21 and 22, and the relative variation in the speed of movement of the belts 21 and 22 also will contribute toward maintenance of desired spacing of the overcaps along the feed line.

As one example of a station at which overcaps are to be delivered all in the same position, there is herein disclosed a stacking station generally designated 46. At this station there is incuded a chute 47 onto which overcaps 5 are delivered from the belt 38, and it will be noted that said chute delivers onto a narrow, downwardly inclined floor 48 which is only slightly wider than the depth of the overcap skirts 31. See FIGURES 2A, 11, 13 and 18. The floor 48 is provided along the full width of the chute 47 and also extends full length of the wall portion projecting downwardly at an incline from one side of the chute 47 as shown in FIGURE 11. It will be apparent that the wall extension 49 approximates in width the diameters of the overcaps 5. A retainer rod 50 parallels the chute 47 and the extension wall 49 and retains overcaps which might bounce about and also forms a support at 51 for ejector jet nozzle 52. See FIGURES 2A, 11 and 18. A jet of air is continuously delivered through the nozzle 52 from the source line 53 through a suitable control 54, and air from the same source is supplied through the line 55, the control 56 and the strainer 57 to an electrically controlled, air actuated plunger reciprocating unit generally designated 58. Any approved form of such unit may be employed, preferably a well known Bellows unit which is readily and commercially available. See FIGURES 11, 12, 14, 16 and 17.

It will be apparent by reference to FIGURES 11, 13, 18 and 19 that the air jet delivered from the nozzle 52 is directed against each overcap rolling down the supporting floor 48. The arrangement is such that when overcaps are moving along the supporting floor or ledge 48 with their tops or crown portions toward the jet, the air jet will pass over them without displacing them, as indicated in FIGURE 18, whereas when such overcaps are moving along with their hollow portions 32 directed outwardly to receive the air jet therein, as indicated in FIGURE 19, such overcaps will be ejected from the line, as hereinafter described.

The unit 58 includes the usual cylinder 59 having therein a reciprocable piston 60, and the same is supported at 61 on a mounting base 62 from which an open sided stacker column 63 projects. The stacker column includes a bottom ring 64 presenting a retaining shoulder 65, and the base 62 is apertured at 66 to receive the stacking plunger 67 which is attached at 68 to the cylinder piston 60 and which, when in retracted position, presents a floor 69 in the stacker column on which to receive overcaps 5 as they roll through the clearance slot 70 in the stacker ring 64, as shown in FIGURE 14.

The stacking plunger unit also includes the usual impulse solenoid 71 which actuates the usual air control valve in proper timed sequence under control of the usual commercially available timer 72 which is connected with the unit as at 73 and with the power source at 74.

Directly opposite the air jet nozzle 52 the runway wall 49 is interrupted at 75 and provided with an overcap rejecting chute 76.

In the operation of the apparatus as herein disclosed, the plastic overcaps 5 molded in the injection molding machine 6 are delivered indiscriminately onto the lower or receiving end of the upwardly inclined lower or receiving end of the intake conveyor 7. As the overcaps are carried along by the inclined portion of the belt 7, any overcaps which may be superposed on others are stripped off as the overcaps pass under the rotor 15, as clearly illustrated in FIGURE 3. As the overcaps pass along on the upper or horizontally disposed part of the belt 7 they are delivered onto the dead plate 26 as shown in FIGURES 1 and 4 and from thence are picked up by the pins 27 on the conveyor 21 and carried along on said conveyor, telescoping over the pins in the manner illustrated at the left in FIGURE 5, and in FIGURE 8, that is with their hollow portions 32 downward, or resting with their top or crown portions 31 on the upper end extremities of the pins and with their skirts 31 extending upward, or in other words in the hollow-up position. All overcaps extending along in the pin telescoping or hollow-down position pass under the stripper or diverter bar 35 and are delivered over the end of the conveyor 21, and all overcaps travelling in the hollow-up position will engage said bar 35 and be stripped off the rounded upper end extremities of the pins and diverted to the side onto the belt 22, as shown in FIGURE 5. All overcaps thus diverted onto the belt 22 will be delivered over the end thereof, and, with the overcaps being delivered off the end of the pin equipped belt 21, will be delivered onto the take-away belt 38 which extends beneath the delivery end portions of both belts 21 and 22, as will be clearly apparent by reference to FIGURES 2A, 6 and 11.

Overcaps delivered from the belt 21 will be gradually released by the pins 27 onto the downwardly inclined dead plate 44 and will fall therefrom with their skirts 31 directed downwardly onto the take-away belt 38, as clearly illustrated in FIGURES 6 and 9. The overcaps being delivered over the end of the belt 22 in hollow-up position will pass through a free falling stage and when they have turned slightly more than 90° they will engage the dead plate 45 as indicated in dot and dash lines in FIGURE 10, being turned with their skirts 31 directed downwardly against the take-away belt 38. It will be apparent that by thus engaging each overcap with the dead plate 45 before contacting with the moving belt 38, the desired inversion falling of the overcaps is assured in each instance. From the foregoing, it will be apparent that all overcaps are delivered onto the take-away belt or conveyor 38 in the hollow-down position.

As before stated, the speeding up of the belt 22 relative to the speed of linear movement of the pin equipped belt 21 tends to restore the relation of each overcap on the belt 22 at its delivery end to the relation it bore to overcaps on said belt 21 prior to the lateral diversion at 35, thus tending to avoid disruptive placement of the overcaps on the take-away conveyor 38. Speeding up of the take-away conveyor 38 relative to the travel of the belts 21 and 22 also tends to assure against disruptive arrangement of the overcaps prior to delivery over the end of the conveyor 38.

Following deposition of the overcaps 5 onto the chute 47, said overcaps roll down the floor or ledge 48 behind the guide 50 and pass individually through the stacker column ring slot 70 into the stacking position illustrated in FIGURE 14, and as the overcaps successively come into this position, the electrically controlled air actuated unit operates to reciproate the plunger 67 and move the overcaps one-by-one up into the stacker column, each skirt snapping behind the shoulder 65 and retaining the superposed stack in position, as illustrated in FIGURE 14.

Should there be any malfunctioning of parts, due to bouncing about, or otherwise occasioned displacement of overcaps so that one or more thereof may be moving along the floor or ledge 48 with their skirts 31 or hollow portions 32 projected outwardly as indicated in FIGURE 19, the air jet delivered through the nozzle 52 would engage within such overcap skirts and eject them out over the interruption 75 in the wall 49 and deliver them into the reject chute 76.

It is preferred that the wall of the chute 47 be provided with suitably placed apertures 77 so that each overcap coming opposite said wall will engage over apertures, thus to assure that a vacuum is not created in the overcaps due to cooling of the air in the hollow portion 32 thereof as the recently molded overcaps cool. Such a vacuum, if not broken, would cause the overcaps to adhere to opposing chute wall portions and prevent them from rolling freely down the floor 48.

While preferred part structures and arrangements are disclosed herein, it is to be understood that variations in such structures and part arrangements may be made without departing from the spirit and scope of the invention as outlined in the appended claims.

We claim:

1. In an apparatus for orienting cap-like articles having top portions and peripheral skirts defining therewithin a hollow, a travelling belt conveyor portion for receiving the articles in indiscriminate hollow-down hollow-up positions and which is provided with upstanding pin means arranged in spaced relation for engaging the hollow of each article presented thereon in hollow-down position and supporting said article with its skirt extending into proximity with the surface of the conveyor from which the pin means project, pin means for receiving thereon articles in hollow-up position and for supporting said articles by engagement of their top portion on said pin means with the skirts of said articles projecting upwardly well above the tops of the pin means; wherein all of said pin means are the same pins, and means for sweeping off from the belt such hollow-up articles, thereby to present at a delivery end portion of the belt only such articles as are moving hollow-down on the belt portion; wherein there is included a second conveyor belt portion travelling beside the pin equipped belt portion in position to receive and convey the hollow-up articles swept off the pin equipped belt portion, there also being included means supporting said second belt so that its article receiving surface is disposed approximately at the level of the tops of the pins on the pin equipped belt, and for causing said second belt portion to move at a greater lineal speed than the pin equipped belt portion.

2. Apparatus as defined in claim 1 wherein there are also included means for delivering the articles onto the pin equipped belt portion in said indiscriminate hollow-up hollow-down positions, and means cooperating with said last named means in preventing delivery to the pin equipped conveyor portions of articles in superposed relation, wherein there also are included a take-away belt having a receiving end portion disposed below delivery end portions of the pin equipped belt portion and the belt portion travelling at its side and wide enough to receive articles delivered thereonto by both said belt portions, means engageable by articles as they are being delivered by said pin equipped belt portion to cause them to remain in their hollow-down position as they fall upon the take-away belt, and means engageable by articles as they are being delivered by the belt portion beside the pin equipped belt portion to cause them to be inverted from hollow-up position to a hollow-down position as they fall upon said take-away belt.

3. Apparatus as defined in claim 1 wherein there are also included conveyor belt means for delivering the articles onto the pin equipped belt portion in said indiscriminate hollow-up hollow-down positions, and rotor means traversing said article delivering conveyor belt and having thereon peripheral projections moving in a direction counter to the direction of movement of said delivery belt and spaced therefrom to be engageable only with articles superposed on other articles and not with sole articles, wherein there are also included a take-away belt having a receiving end portion disposed below delivery end portions of the pin equipped belt portion and the belt portion travelling at its side and wide enough to receive articles delivered thereonto by both said belt portions, means engageable by articles as they are being delivered by said pin equipped belt portion to cause them to remain in their hollow-down position as they fall upon the take-away belt, and means engageable by articles as they are being delivered by the belt portion beside the pin equipped belt portion to cause them to be inverted from hollow-up position to a hollow-down position as they fall upon said take-away belt.

4. Apparatus as defined in claim 1 wherein there are also included means for delivering the articles onto the pin equipped belt portion in said indiscriminate hollow-up hollow-down positions, and means cooperating with said last named means in preventing delivery to the pin equipped conveyor portions of articles in superposed relation, wherein there also are included a take-away belt having a receiving end portion disposed below delivery end portions of the pin equipped belt portion and the belt portion travelling at its side and wide enough to receive articles delivered thereonto by both said belt portions, an inclined plate means engageable by articles as they are being gradually released by the pins previously supporting them as they are being delivered to fall upon the take-away belt to cause them to remain in their hollow-down position as they fall upon said take-away belt, and a dead plate means overlying the take-away belt in position to intercept the articles falling from the belt portion beside the pin equipped belt portion to prevent contact with the take-away belt until after each said article has turned slightly more than 90° in falling and has contacted said last named dead plate means in its course of inversion falling over onto the take-away belt.

5. In an apparatus for orienting cap-like articles having top portions and peripheral skirts defining therewithin a hollow, a travelling belt conveyor portion for receiving the articles in indiscriminate hollow-down hollow-up positions and which is provided with upstanding pin means arranged in spaced relation for engaging the hollow of each article presented thereon in hollow-down position and supporting said article with its skirt extending into proximity with the surface of the conveyor from which the pin means project, pin means for receiving thereon articles in hollow-up position and for supporting said articles by engagement of their top portion on said pin means with the skirts of said articles projecting upwardly well above the tops of the pin means; wherein all of said pin means are the same pins, and means for sweeping off from the belt such hollow-up articles, thereby to present at a delivery end portion of the belt only such articles as are moving hollow-down on the belt portion; wherein there is included a second conveyor belt portion travelling beside the pin equipped belt portion in position to receive and convey the hollow-up articles swept off the pin equipped belt portion, drive means for said pin equipped belt portion and said second belt portion having a drive pulley axis common to both and said second belt portion overlying and being moved with a lateral extension of the pin equipped belt portion so that the article conveying surface of the second belt portion is spaced from the axis a distance greater than the surface from which the pins project from the pin equipped belt portion and with its article conveying surface approximating the level of the tops of said pins.

6. In an apparatus for orienting cap-like articles having top portion and peripheral skirts defining therewithin a hollow, a travelling belt conveyor portion for receiving the articles in indiscriminate hollow-down hollow-up positions and which is provided with upstanding pin means arranged in spaced relation for engaging the hollow of each article presented thereon in hollow-down position and supporting said article with its skirt extending into proximity with the surface of the conveyor from which the pin means project, pin means for receiving thereon articles in hollow-up position and for supporting said articles by engagement of their top portion on said pin means with the skirts of said articles projecting upwardly well above the tops of the pin means; wherein all of said pin means are the same pins, and means for sweeping off from the belt such hollow-up articles, thereby to present at a delivery end portion of the belt only such articles as are moving hollow-down on the belt portion; wherein there is included a second conveyor belt portion travelling beside the pin equipped belt portion in position to receive and convey the hollow-up articles swept off the pin equipped belt portion, there also being included means supporting said second belt so that its article receiving surface is disposed approximately at the level of the tops of the pins on the pin equipped belt, and wherein there is also included means for delivering the articles onto the pin equipped belt portion in said indiscriminate hollow-up hollow-down position, and means cooperating with said last named means in preventing delivery to the pin equipped conveyor portions of articles in superposed relation.

7. In an apparatus for orienting cap-like articles having top portion and peripheral skirts defining therewithin a hollow, a travelling belt conveyor portion for receiving the articles in indiscriminate hollow-down hollow-up positions and which is provided with upstanding pin means arranged in spaced relation for engaging the hollow of each article presented thereon in hollow-down position and supporting said article with its skirt extending into proximity with the surface of the conveyor from which the pin means project, pin means for receiving thereon articles in hollow-up position and for supporting said articles by engagement of their top portion on said pin means with the skirts of said articles projecting upwardly well above the tops of the pin means; wherein all of said pin means are the same pins, and means for sweeping off from the belt such hollow-up articles, thereby to present at a delivery end portion of the belt only such articles as are moving hollow-down on the belt portion; wherein there is included a second conveyor belt portion travelling beside the pin equipped belt portion in position to receive and convey the hollow-up articles swept off the pin equipped belt portion, there also being included means supporting said second belt so that its article receiving surface is disposed approximately at the level of the tops of the pins on the pin equipped belt, and wherein there is also included conveyor belt means for delivering the articles onto the pin equipped belt portion in said indiscriminate hollow-up hollow-down positions, and rotor means traversing said article delivering conveyor belt and having thereon peripheral projections moving in a direction counter to the direction of movement of said delivery belt and spaced therefrom to be engageable only with articles superposed on other articles and not with sole articles, said article delivering conveyor including means for delivering the articles onto a receiving end portion of the pin equipped belt portion over a dead plate disposed over said receiving end portion.

8. In an apparatus for orienting cap-like articles having top portions and peripheral skirts defining therewithin a hollow, a travelling belt conveyor portion for receiving the article in indiscriminate hollow-down hollow-up positions and which is provided with up-standing pin means arranged in spaced relation for engaging the hollow of each article presented thereon in hollow-down position and supporting said article with the skirt extending into proximity with the surface of the conveyor from which the pin means project, pin means for receiving thereon articles in hollow-up position and for supporting said articles by engagement of their top portion on said pin means with the skirts of said articles projecting upwardly well above the tops of the pin means; wherein all of said pin means are the same pins, and means for sweeping off from the belt such hollow-up articles, thereby to present at a delivery end portion of the belt only such articles as are moving hollow-down on the belt portion; also including a second conveyor belt portion travelling beside the pin-equipped belt portion in position to receive and convey the hollow-up articles swept off the pin-equipped belt portions wherein there are also included a take-away belt having a receiving end portion disposed below delivery end portions of the pin equipped belt portion and the belt portion travelling at its side and wide enough to receive articles delivered thereonto by both said belt portions, means engageable by articles as they are being delivered by said pin equipped belt portion to cause them to remain in their hollow-down position as they fall upon the take-away belt, and means engageable by articles as they are being delivered by the belt portion beside the pin equipped belt portion to cause them to be inverted from hollow-up position to a hollow-down position as they fall upon said take-away belt.

9. Apparatus as defined in claim 8 wherein there also is included diverter bar means traversing at least a portion of the take-away belt and disposed beyond said means for causing the articles to remain in hollow-down positions as they fall onto the take-away belt and the means for causing the articles to be inverted into hollow-down position as they fall onto said take-away belt, said diverter bar means being effective to cause all of said hollow-down articles to move on the take-away belt in single file relation.

10. In an apparatus for orienting cap-like articles having top portions and peripheral skirts defining therewithin a hollow, a travelling belt conveyor portion for receiving the article in indiscriminate hollow-down hollow-up positions and which is provided with up-standing pin means arranged in spaced relation for engaging the hollow of each article presented thereon in hollow-down position and supporting said article with its skirt extending into proximity with the surface of the conveyor from which the pin means project, pin means for receiving thereon articles in hollow-up position and for supporting said articles by engagement of their top portion on said pin means with the skirts of said articles projecting upwardly well above the tops of the pin means; wherein all of said pin means are the same pins, and means for sweeping off from the belt such hollow-up articles, thereby to present at a delivery end portion of the belt only such articles as are moving hollow-down on the belt portion; also including a second conveyor belt portion travelling beside the pin-equipped belt portion in position to receive and convey the hollow-up articles swept off the pin-equipped belt portion wherein there are also included a take-away belt having a receiving end portion disposed below delivery end portions of the pin equipped belt portion and the belt portion travelling at is side and wide enough to receive articles delivered thereonto by both said belt portions, an inclined plate means engageable by articles as they are being gradually released by the pins previously supporting them as they are being delivered to fall upon the take away belt to cause them to remain in their hollow-down position as they fall upon said take-away belt, and a dead plate means overlying the take-away belt in position to intercept the articles falling from the belt portion beside the pin equipped belt portion to prevent contact with the take-away belt until after each said article has turned slightly more than 90° in falling and has contacted said last named dead plate means in its course of inversion falling over onto the take-away belt.

11. Apparatus as defined in claim 10 wherein there also is included diverter bar means traversing at least a portion of the take-away belt and disposed beyond said inclined plate means and said dead plate means and effective to cause all of said hollow-down articles to move on the take-away belt in single file relation.

References Cited by the Examiner

UNITED STATES PATENTS

| | | | |
|---|---|---|---|
| 1,118,972 | 12/1914 | Torres | 221—156 |
| 1,148,005 | 7/1915 | Bogdanffy | 198—33.4 |
| 1,446,359 | 2/1923 | Thom | 198—29 X |
| 1,908,855 | 5/1933 | Makenny | 221—156 |
| 2,169,772 | 8/1939 | Schweitzer | 198—198 |
| 2,847,110 | 8/1958 | Rysti | 198—33.4 |

FOREIGN PATENTS 83,397  11/1956  Netherlands.

EVON C. BLUNK, *Primary Examiner.*

RICHARD E. AEGERTER, *Examiner.*